No. 623,555. Patented Apr. 25, 1899.
G. C. OTTEN & K. F. HENNEMAN.
ALCOHOL OR SPIRIT LAMP.
(Application filed May 16, 1898.)
(No Model.)
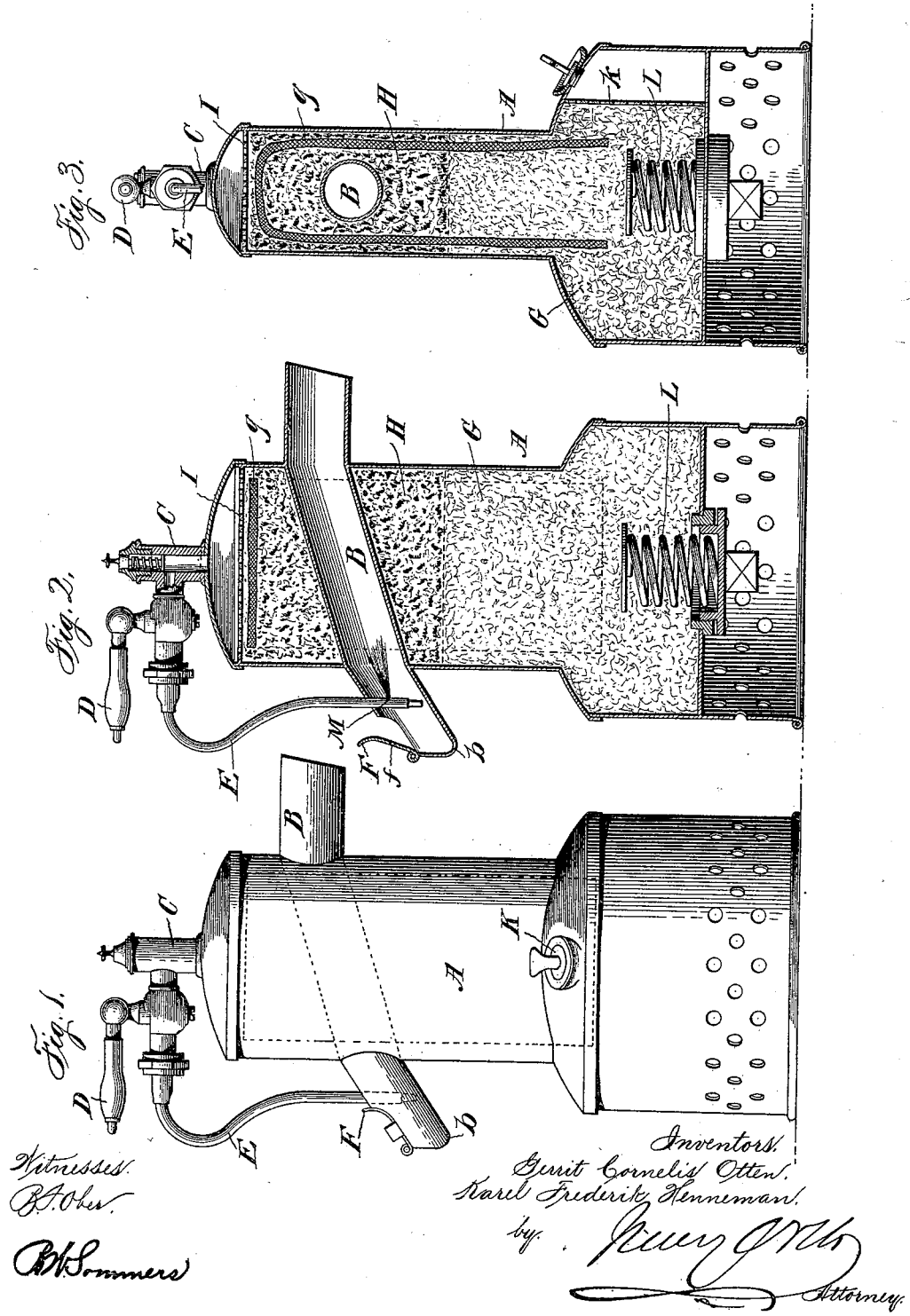

UNITED STATES PATENT OFFICE.

GERRIT CORNELIS OTTEN AND KAREL FREDERIK HENNEMAN, OF THE HAGUE, NETHERLANDS.

ALCOHOL OR SPIRIT LAMP.

SPECIFICATION forming part of Letters Patent No. 623,555, dated April 25, 1899.

Application filed May 16, 1898. Serial No. 680,849. (No model.)

*To all whom it may concern:*

Be it known that we, GERRIT CORNELIS OTTEN and KAREL FREDERIK HENNEMAN, of The Hague, in the Kingdom of the Netherlands, have invented certain new and useful Improvements in Alcohol or Spirit Lamps; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to alcohol or spirit lamps, and more particularly to those used in drying or roasting coffee and other grains.

The object of our said invention is to produce a lamp of a kind which will be at the same time safe and economical in use.

In order that our invention may be readily understood, we will describe the same, with reference to the accompanying drawings, in which—

Figure 1 is an elevation of the improved lamp. Fig. 2 is a vertical section of the same, and Fig. 3 is a transverse vertical section thereof.

The lamp is composed of a body A, through which passes a burner-tube B. This body A has an air-tight lid provided with a safety-valve C, the casing of which communicates, by means of a tube E and cock D, with the front end of the burner-tube B. The said tube E is provided at M with one or more openings for the injection of the alcoholic vapor into the burner-tube B. In the body of the lamp are arranged one above another layers of cotton-waste G or other absorbent material and asbestos-waste H.

I is a partition of wire-gauze to prevent the asbestos from entering the valve-casing C and choking the valve.

In this apparatus the burner-tube is always surrounded by asbestos, and consequently the cotton or other absorbent materials are never in direct contact with the burner-tube, the advantage of which is that the cotton or other absorbent materials which may be used can never become carbonized by the intense heat of the burner-tube, which would take place when the alcohol in the lamp is exhausted if the cotton were in direct contact with the burner-tube. There are, however, other important reasons why we prefer to surround the burner-tube with a non-combustible absorbent, preferably asbestos. This substance is a good non-conductor of heat, so that the heat radiated from the burner-tube is not to any great extent transmitted to the alcohol-saturated cotton-waste, which is a good absorbent of heat, thereby insuring the more uniform evaporation of the alcohol held by the asbestos immediately surrounding the burner-tube. Of course asbestos alone could be used as an absorbent material; but, as is well known, asbestos in a finely-divided state has a tendency to pack more or less solidly when saturated with a liquid, forming a more or less dense body, through which the liquid filters very slowly, and to provide an adequate supply of alcohol to source of heat—*i. e.*, to the asbestos surrounding the burner-tube—we prefer to use in conjunction with the asbestos an absorbent that will not pack or that will not readily do so, and thus afford to the liquid a practically free passage therethrough and to the asbestos.

The operation of the lamp is as follows: Alcohol is introduced into the body of the lamp at the inlet K, which opens into the mass of cotton-waste G, this opening being separated from it by a small partition of wire-gauze $k$. The cotton vigorously absorbs this alcohol, which then rises by capillary attraction to the asbestos-waste H, surrounding the burner-tube B, which in its turn becomes soaked. The rising of the alcohol is sometimes further aided by a wick $g$, passing from the layer of cotton or other absorbent material around the whole layer of asbestos. As the asbestos receives the heat of the burner-tube B, this heat vaporizes the alcohol dispersed in the asbestos and the cotton, and this vapor passes from the apparatus through the valve-casing C of the air-tight lid and into the burner-tube B, through the tube E, when the cock D is open.

It is evident that in order that the vaporization of the alcohol may take place it is necessary that the burner-tube B should first of all be in operation—that is to say, that it should be heated. This is effected by a starting device b in the front part of the burner-tube B, this front part being closed at the back to form a pocket, into which a small quantity of alcohol is poured and ignited. As shown in Figs. 1 and 2, this pocket is provided with a lid F, in the center of which is a small opening f. This lid, according as it is more or less open, serves to regulate the admission of air into the burner-tube. The alcohol in the pocket b in burning heats the tube B, and when vapor is produced from the alcohol inside the apparatus the cock D is opened and the said vapor escapes by the tube E and the opening M and ignites when it comes into contact with the alcohol in the said pocket b. To insure a large flame with this apparatus, a burner-tube B must be used of a diameter sufficiently large, and in this case the alcohol-vapor instead of being injected by a single opening M into the burner-tube should be injected into the burner-tube by two, three, four, or more openings, depending on the diameter of the burner-tube.

The spring L (shown in Figs. 2 or 3) is intended to push upward the center of the mass of cotton or other absorbent material, which might otherwise sink.

It will be understood that a lamp thus constructed offers great advantages compared with what has hitherto been produced in this kind of apparatus.

This lamp may be held upside down without inconvenience and without danger in consequence of the alcohol not being able to enter the burner-tube. The size of the flame may be regulated, first, by the cock D by allowing more or less alcohol-vapor to enter the tube B, and, second, by the lid F by allowing more or less air to enter the tube B. When the flame is no longer required, the exit of the alcohol-vapor is stopped by closing the cock D. The vapor remaining in the apparatus is recovered in alcohol in proportion to its condensation, which takes place with the cooling of the said apparatus.

To get a very large flame without danger, it is necessary only to increase the size of the body A, with its contents, to use a burner-tube of larger diameter, and to cause more alcohol-vapor to enter this burner-tube. In such case and when the lamp has to work for a long time the reservoir which contains the alcohol is placed in contact with water to keep it cold.

We do not wish to limit ourselves to the use of a single burner-tube in the body A of the lamp, as more than one such tube may be employed. In this case it is necessary to use more than one tube E.

Although our improved lamp is intended more particularly for the roasting of coffee and other vegetable substances, it may be employed for other purposes.

Having now particularly described and ascertained the nature of our said invention and in what manner the same is to be performed, we declare that what we claim is—

1. A lamp such as described comprising a reservoir or fount, a filler therein, a vapor-chamber above said filler, a burner-tube closed at one end extending through the fount and filler both ends of the tube projecting from the fount, means for supplying air to said tube at its closed end, and an external valved vapor-feed pipe connecting the feed-tube near its closed end with the aforesaid vapor-chamber, for the purpose set forth.

2. A lamp such as described comprising a reservoir or fount, a burner-tube extending therethrough, both ends of the tube projecting from said fount, one of said ends closed and provided with a pocket, and means for gaining access to said pocket and for admitting air to the tube, and an external valved vapor-feed pipe connecting the upper end of the fount with the feed-tube in advance of the aforesaid pocket, for the purpose set forth.

3. A lamp such as described comprising a reservoir or fount, a filler therein consisting of an organic and an inorganic substance, a burner-tube extending through the reservoir and the inorganic substance, and a vapor-feed pipe connecting one end of the burner-tube with the reservoir, for the purpose set forth.

4. A lamp such as described, comprising a reservoir or fount provided with a tubular outlet at its upper end, a safety-valve in the outer end of said outlet, a foraminous diaphragm below said outlet, and an absorbent filler below said diaphragm; in combination with a burner-tube extending transversely through the reservoir and filler, and a vapor-feed pipe connecting the reservoir above the aforesaid diaphragm with one end of the burner-tube, for the purpose set forth.

5. A lamp such as described, comprising a reservoir or fount, a vapor-chamber in its upper end, a liquid-fuel-feed chamber in its lower end, both in communication with said reservoir, an absorbent filler between said chambers and means for supplying liquid fuel to the aforesaid feed-chamber; in combination with a burner-tube extending transversely through the reservoir and filler, and a valved vapor-feed pipe connecting one end of the vapor-tube with the vapor-chamber of the reservoir, for the purpose set forth.

6. A lamp such as described, comprising a reservoir or fount, a vapor-collecting chamber at its upper end, an absorbent filler below said chamber, a wick extending over the filler down toward the bottom of the reservoir, and a spring-actuated follower arranged axially of the fount on the bottom thereof and acting upon the filler; in combination with a burner-tube extending transversely through the reservoir and filler, and a vapor-feed pipe connecting one end of said tube with the aforesaid vapor-collecting chamber, for the purpose set forth.

7. A lamp such as described, comprising a reservoir or fount, an absorbent filler therein, a burner-tube extending transversely through the reservoir and filler, said tube having at one end a pocket for liquid fuel, and a lid-covered opening above said pocket, and a vapor-feed pipe connecting the burner-tube in advance of the pocket therein with the upper end of the reservoir, for the purpose set forth.

8. A lamp such as described, comprising a reservoir or fount having a lower portion of greater cross-sectional area than the remaining portion, and an air-space below its bottom, a liquid-fuel-feed chamber in said enlarged portion formed by a vertical foraminous diaphragm, means for feeding such fuel to said chamber, an absorbent filler composed in part of a mineral absorbent, a vapor-collecting chamber formed by a horizontal diaphragm above the filler, a tubular extension leading from said chamber, and a safety-valve in the outer end of said extension; in combination with a burner-tube extending transversely through the reservoir and mineral absorbent, and a valve-controlled vapor-feed pipe connecting one end of the burner-tube with the aforesaid extension of the vapor-collecting chamber, for the purpose set forth.

In testimony that we claim the foregoing as our invention we have signed our names in presence of two subscribing witnesses.

GERRIT CORNELIS OTTEN.
    KAREL FREDERIK HENNEMAN.

Witnesses:
 A. C. LISTOE,
 AIRE H. VOORWINDEN.